United States Patent
Shimoda (10) Patent No.: US 10,279,621 B2
(45) Date of Patent: May 7, 2019

(54) VEHICLE WHEEL

(71) Applicant: HONDA MOTOR CO., LTD., Tokyo (JP)

(72) Inventor: Shinsuke Shimoda, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 30 days.

(21) Appl. No.: 15/793,205

(22) Filed: Oct. 25, 2017

(65) Prior Publication Data

US 2018/0117959 A1    May 3, 2018

(30) Foreign Application Priority Data

Oct. 28, 2016    (JP) .................. 2016-211332

(51) Int. Cl.
*B60B 1/14*    (2006.01)
*B60B 1/08*    (2006.01)
*B60B 5/02*    (2006.01)

(52) U.S. Cl.
CPC .............. *B60B 1/14* (2013.01); *B60B 1/08* (2013.01); *B60B 5/02* (2013.01); *B60B 2360/104* (2013.01); *B60B 2360/341* (2013.01)

(58) Field of Classification Search
CPC .... B60B 1/14; B60B 1/08; B60B 5/02; B60B 2360/341; B60B 2360/104; B60B 3/04; B60B 3/041; B60B 3/042; B60B 3/044; B60B 3/047; B60B 3/10; B60B 23/08; B60B 25/22
USPC ............ 301/64.701, 64.702, 64.705, 64.706
See application file for complete search history.

(56) References Cited

U.S. PATENT DOCUMENTS

| 5,022,712 A * | 6/1991 | Woelfel ............. B60B 5/02 301/35.632 |
| 5,454,628 A * | 10/1995 | Maiworm ........... B60B 1/08 301/35.632 |
| 6,416,135 B1 * | 7/2002 | Greubel .............. B60B 3/02 301/35.625 |
| 7,918,513 B2 * | 4/2011 | Wilson ............... B60B 1/06 301/64.101 |
| 2008/0265656 A1 * | 10/2008 | Heyse ............. B29C 70/342 301/55 |
| 2011/0089750 A1 * | 4/2011 | Colegrove ........... B60B 5/02 301/95.102 |
| 2016/0325582 A1 * | 11/2016 | Werner ............. B60B 3/041 |

FOREIGN PATENT DOCUMENTS

JP    05-016602    1/1993

* cited by examiner

*Primary Examiner* — S. Joseph Morano
*Assistant Examiner* — Jean W Charleston
(74) *Attorney, Agent, or Firm* — Rankin, Hill & Clark LLP (57) ABSTRACT

The fastening through hole includes the conical hollow portion conically hollowed from the tube outer circumferential surface of the rim, the through hole penetrating the rim at a center portion of the conical hollow portion in a diametrical direction. The opening of the conical hollow portion on a side of the tube outer circumferential surface includes the conical tube having an external conical shape which is substantially the same as the conical hollow portion. The conical tube of the conical tube is set to be greater than a diameter of the head portion of the male screw member.

7 Claims, 8 Drawing Sheets

VEHICLE WHEEL

CROSS REFERENCE TO RELATED APPLICATION

This application claims the foreign priority benefit under Title 35, United States Code, § 119(a)-(d) of Japanese Patent Application No. 2016-211332, filed on Oct. 28, 2016 in the Japan Patent Office, the disclosure of which is herein incorporated by reference in its entirety.

BACKGROUND OF THE INVENTION

1. Field of the Invention

The present invention relates to a vehicle wheel.

2. Description of the Related Art

The vehicle wheels are formed using light metals such as aluminum alloy, etc. For further weight saving, it is considered to mold the vehicle wheel with CFRP (carbon fiber reinforced plastic). However, if the vehicle wheel is molded only with CFRP, a manufacturing cost may increase.

JP05-16602 disclosed a hybrid wheel of which rim and spoke are fastened with bolts, using CFRP as the rim and aluminum alloy as the spoke.

SUMMARY OF THE INVENTION

An aspect of the present invention provides a vehicle wheel comprising:
a rim that is made of fiber-reinforced resin and has a substantially circular tube shape;
a fastening through hole penetrating a wall of a tube of the rim;
a bushing that has a substantially tube shape and is inserted through the fastening through hole;
a spoke that is disposed inside the rim and made of a light metal;
a female screw hole that opens at a circumferential surface of the spoke and has female thread on an inner circumferential surface thereof; and
a male screw member that penetrates the bushing from a side of outer circumferential surface of the tube of the rim and engages with the female screw hole to fasten the rim to the spoke,
wherein the fastening through hole comprises:
a conical hollow portion hollowed in a conical shape in the outer circumferential surface of the tube of the rim; and
a through hole penetrating the rim in a diametrical direction at a center portion of the conical hollow portion, wherein an opening on a side of the outer circumferential surface of the tube at the conical hollow portion is set to have a larger diameter than a diameter of a head portion of the male screw member;
wherein the bushing comprises:
a conical tube portion having a conical exterior shape which is substantially equivalent to the conical shape of the conical hollow portion, and
wherein an end portion on a large diameter side of the conical tube is set to have a diameter larger than a diameter of the head portion of the male screw member.

According to the above-described configuration, the male screw member is disposed, penetrating the tube wall of the rim from a side of the outer circumferential surface side of the rim, so that the male screw member is disposed inside the air chamber of the tire.

This provides fastening the rim and the spoke without external exposure of the male screw member, which suppresses electrolytic corrosion between the rim and the spoke.

Further, making the larger diameter side end portion of the conical tube of the bushing larger than the diameter of the head portion of the male screw member can decrease the surface pressure on the rim.

This can suppress occurrence of the creep phenomenon in which a distortion increases as time passes when a stress is continuously applied to an object.

An aspect of the present invention provides a vehicle wheel capable of suppressing occurrence of the electrolytic corrosion at connecting portions of the carbon fiber reinforced plastic and the light metal.

DETAILED DESCRIPTION OF THE INVENTION

Prior to describing embodiments of the present invention, the above-mentioned related art is further argued below.

In the vehicle wheel disclosed in JP05-16602, when the vehicle wheel is exposed to rain water because the bolt fastening the rim and the spoke is externally exposed, exposure to rain water causes a voltage potential difference between the carbon fibers of CFRP and the aluminum alloy. The voltage potential difference may corrode the fastening portion (electrolytic corrosion).

The present invention provides a vehicle wheel capable of suppressing electrolytic corrosion at the fastening portion of the fiber-reinforced resin and a light metal.

Embodiments according to the present invention are described in detail below, referring to drawings. The same or corresponding structural elements are designated with the same or corresponding references, and a duplicated description is omitted.

First Embodiment

Figure 1:
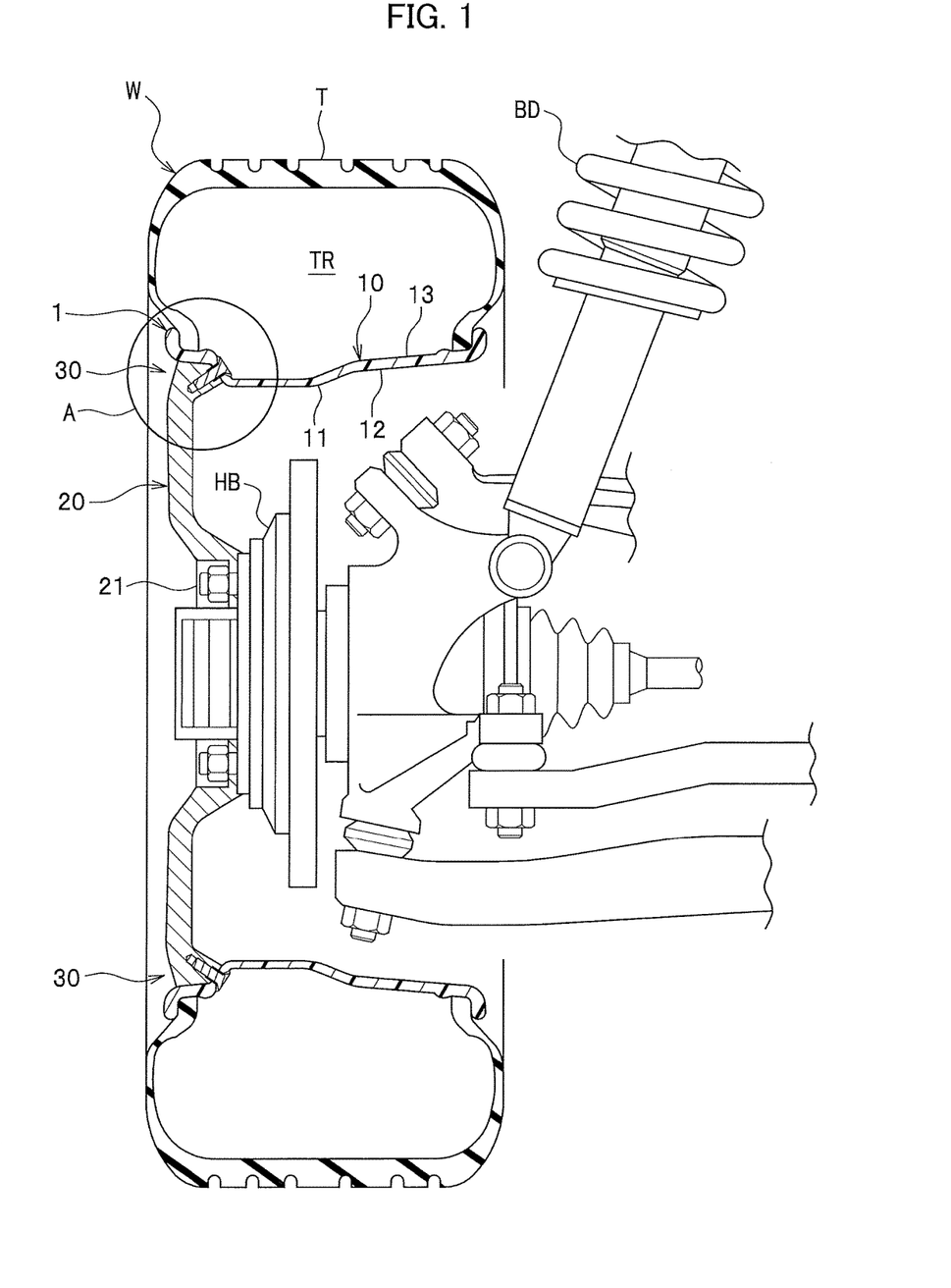
FIG. 1 is a schematic drawing showing a state of the vehicle wheel according to embodiments of the present invention in which the vehicle wheel according to the embodiment of the present invention is attached to a vehicle.

As shown in FIG. 1, a vehicle wheel 1 according to the embodiments forms a tire wheel W of a vehicle together with a pneumatic tire T which is assembled with the vehicle wheel 1 and into which the air is charged. The vehicle wheel 1 is fixed to a hub HB on a side of a vehicle body BD and rotates together with the hub HB.

The vehicle wheel 1 includes a rim 10 and a spoke 20, which are separated member, the rim 10 and the spoke 20 being fastened with a fastening member 30.

The rim 10 has a substantially circular tube shape, and the pneumatic tire T is fitted thereto on an outer circumferential side thereof in which the air is charged. The rim 10 is made of CFRP (carbon fiber reinforced plastic) which a kind of fiber-reinforced resins.

The rim 10 is formed to have the circular tube shape by such a way that bundles of carbon fibers are wound around a mold having a circular pillar shape in a diametric direction of the circular tube (inner molding) or that bundles of carbon fibers are piled on a mold (outer mold) surrounding the circular tube. Autoclave molding or RTM (Resin Transfer Molding) molding may be used. The autoclave molding uses prepreg which is prepared by impregnating fiber-reinforced material with plastic. In the RTM molding, NFCs (Non Crimp Fabric) are piled on the mold, and the mold is clamped. Plastic is injected on the clamped material. In both methods, the rim 10 is completed by mold release after heat hardening.

The spoke 20 is disposed in the tube of the rim 10 and includes a hub mounting part 21 at a center thereof.

The hub mounting part 21 is positioned at a center in a diametrical direction of the tube of the rim 10 in a state that the spoke 20 is assembled with the rim 10 and fixed to the hub HB on the side of the vehicle body BD.

The spoke 20 is made of aluminum allow which is a kind of light metals, and the form of the spoke 20 is made by casting or forging.

The pneumatic tire tire T is a so-called tubeless tire having no tube inside the tire.

An inner surface of the pneumatic tire T and an outer circumferential surface of the rim 10 define a tire air chamber TR. The tire air chamber TR is charged with the air, a nitrogen gas, or the like. at a predetermined air pressure.

Figure 2:
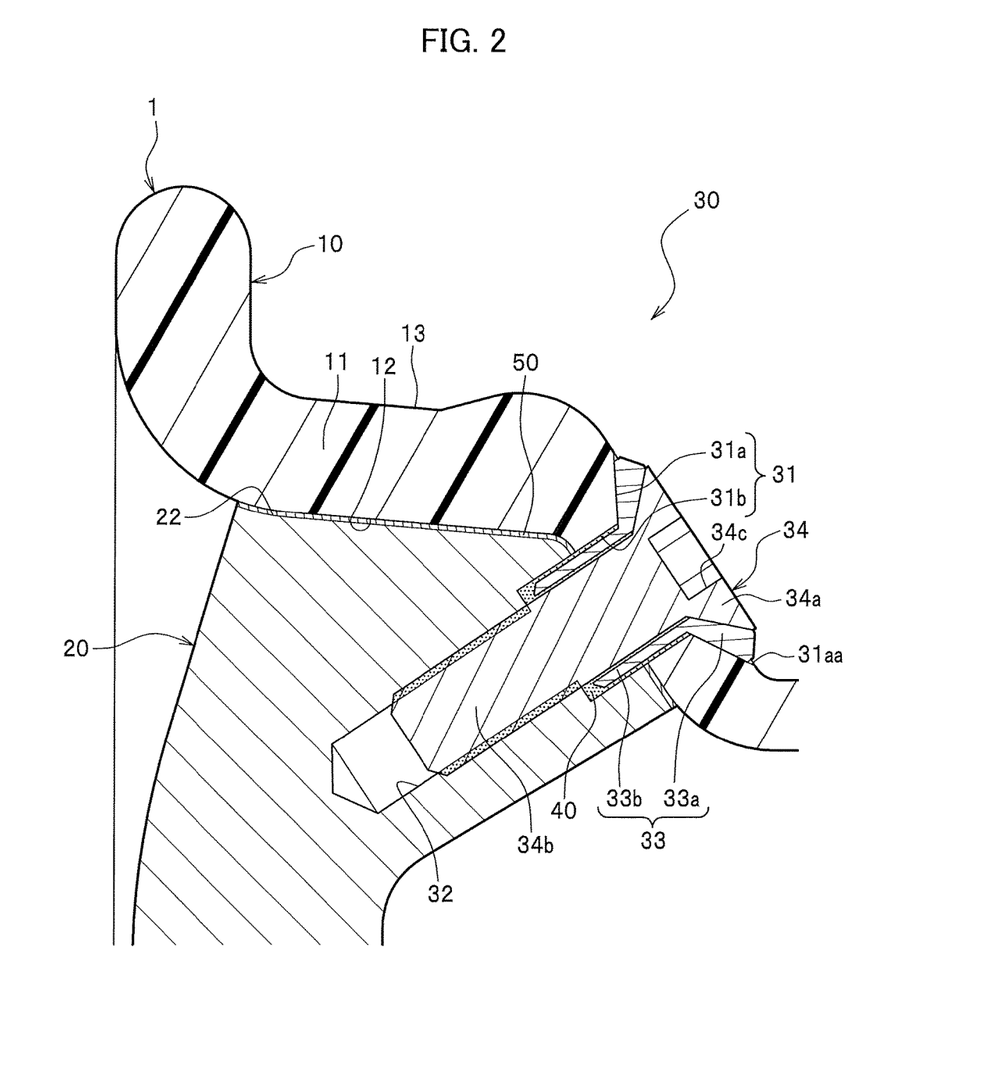
FIG. 2 is an enlarged cross section view of a part A in FIG. 1.

The fastening member 30 includes, as shown in FIG. 2, a fastening through hole 31, a female screw hole 32, a bushing 33, a male screw member 34, an adhesive 40, and a gasket 50.

Figure 3:
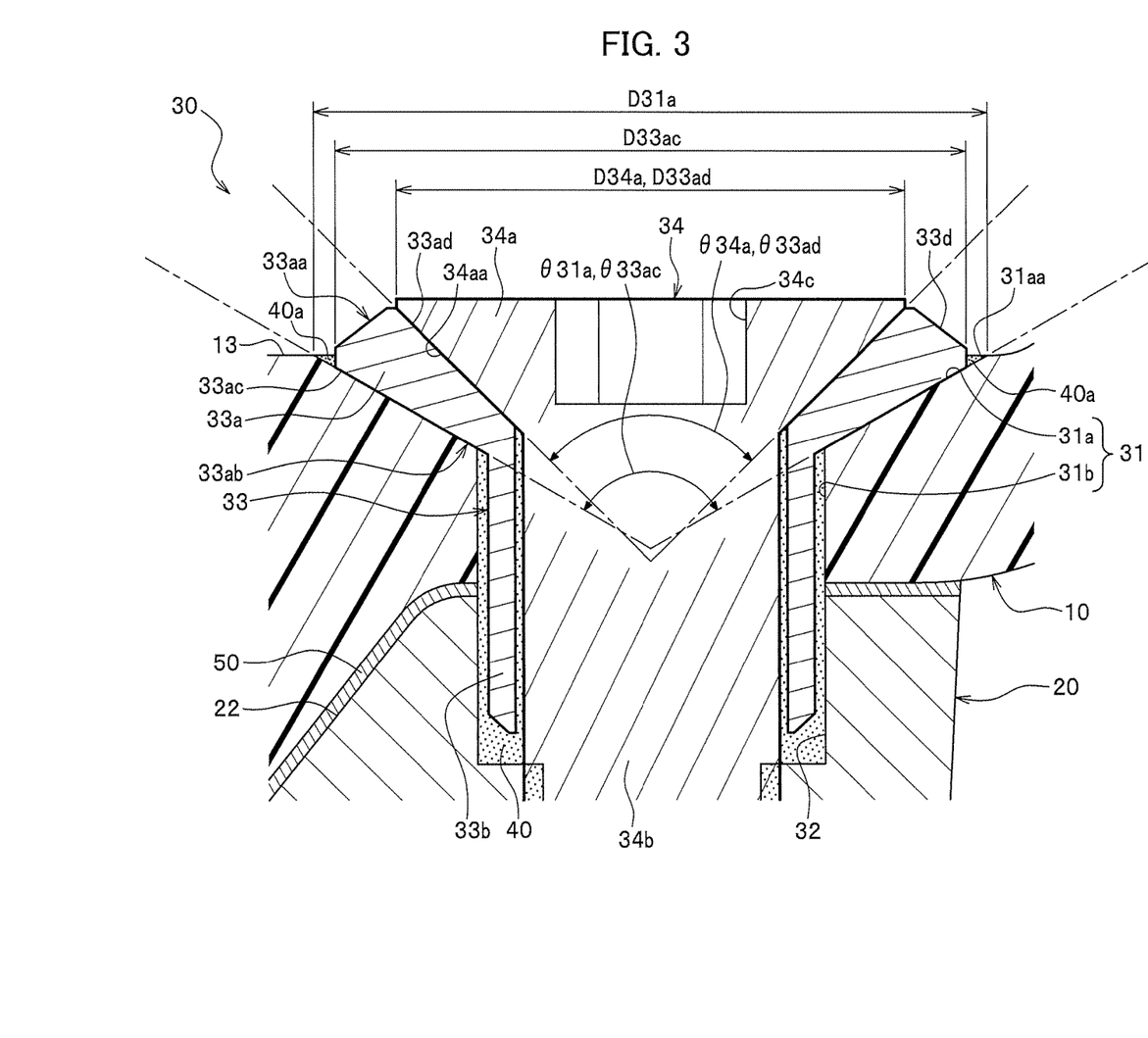
FIG. 3 is an enlarged cross section view of a through hole according to a first embodiment.

The fastening through hole 31 is a through hole penetrating a tube wall 11 opening at a part of the rim 10 where an outer circumferential end surface 22 of the spoke 20 is contact with the rim 10. The fastening through hole 31 is formed by machining process, so that a cut section (piled layers) of carbon fibers is exposed at the hole wall of the fastening through hole 31. The fastening through hole 31 includes a conical hollow portion 31a.

The conical hollow portion 31a includes a hollow portion having a conical shape (suribachi shape) opening on a tube outer circumferential surface 13 of the rim 10, and a vertical angle θ31a of the vertical angle of the conical shape is set to 120 degrees. Further it is set that an opening 31aa of the conical hollow portion 31a has a diameter greater than a head portion diameter D34a which is a diameter of a head portion 34a of the male screw member 34.

A through hole 31b includes a circular pillar through hole which penetrates a circular tube inner circumferential surface 12 of the rim 10 from a center portion of the conical hollow portion 31a.

The female screw hole 32 has openings in the outer circumferential end surface 22 of the spoke 20 abutting the circular tube inner circumferential surface 12 of the rim 10 to have communication with the fastening through hole 31.

Further, the female screw hole is partially threaded on an inner circumferential surface of the female screw hole 32.

The male screw member 34 includes the head portion 34a and a shaft portion 34b and comprises in this embodiment, a countersunk screw made of titanium material.

The head portion 34a has a conical shape having an end surface which is flat, and a head portion vertical angle θ34a, which is a vertical angle of the conical shape, is set to substantially 90 degrees.

The shaft portion 34b is threaded to have a male thread on the outer circumference thereof screwable into the female thread on the female screw hole 32.

The bushing 33 has a funnel shape including a conical tube 33a and a straight tube portion 33b and is made of stainless material in the embodiment.

The conical tube 33a has an exterior having a conical shape which is substantially the same as the conical hollow portion 31a of the fastening through hole 31.

The inner diameter on a larger diameter side D33ad, which is an inner circumferential diameter of a larger diameter side end portion 33aa of the conical tube 33a is set to have substantially the same diameter of the head portion 34a of the male screw member 34.

An outer diameter on a side of a lager diameter side D33ac, which is an outer circumferential diameter of the larger diameter side end portion 33aa of the conical tube 33a is set to a diameter which is slightly smaller than an opening diameter D31a of the conical hollow portion 31a. More specifically, a lager diameter side D33ac of the conical tube 33a is set to a diameter greater than the head portion diameter D34a of the male screw member 34.

Further, an end surface 33d of the larger diameter side end portion 33aa of the conical tube 33a has a taper in which an inner diametrical side protrudes from the outer diameter side outwardly along an axial direction.

The conical tube 33a of the bushing 33 is set to have an inner surface vertical angle θ33ad, which is a vertical angle of the conical shape of a cone inner circumferential surface 33ad, which is an inner circumferential surface of the bushing 33, is set to substantially 90 degrees. Since the inner surface (interior) vertical angle θ33ad and the head portion vertical angle θ34a are set to substantially 90 degrees, the cone inner circumferential surface 33ad and a taper surface 34aa of the head portion 34a contact each other without any gap when the male screw member 34 is fasten.

In the conical tube 33a of the bushing 33, an outer surface (exterior) vertical angle θ33ac, which is a vertical angle of the conical shape in a conical shape outer circumferential surface 33ac, is set to substantially 120 degrees.

More specifically, the conical tube 33a of the bushing 33 is set to have a vertical angle of the conical shape (inner surface vertical angle θ33ad) is greater than the vertical angle (inner surface vertical angle θ33ad) of the conical shape in the conical shape outer circumferential surface 33ac, which is an outer circumferential surface.

The straight tube portion 33b has a circular tube shape having the same diameter as a small-diameter-side end portion 33ab of the conical tube 33a and disposed extending along an axial direction of the cylinder from the small-diameter-side end portion 33ab.

The gasket 50 is pinched between the rim 10 and the spoke 20 to moderate a local surface pressure due to thermal expansion of and load on the spoke 20.

The adhesive 40 is charged between the bushing 33 and the male screw member 34 and between the bushing 33 and the rim 10. Charging the adhesive 40 into respective gaps keeps air-tightness of the tire air chamber TR in which the bushing 33 contacts the rim 10 without gap. Further, drops of the adhesive at gaps around the male screw member 34 are not wiped to keep the air-tightness with the remained adhesive. The adhesive 40 also functions as a stopper of the male screw member 34.

As the adhesive 40, a two-component thermosetting epoxy resin adhesive is used. There are two types of the two-component thermosetting epoxy resin adhesive, i.e., one having elasticity after curing and another one which is hardened after curing. Both types of the adhesives are usable. However, to keep a sealing property between the rim 10 and the bushing 33 even though the rim 10 is elastically deformed by an excessive load applied during travelling of the vehicle, the type having elasticity after curing is preferable.

A fastening process for fastening the rim 10 to the spoke 20 with the fastening member 30 is described below.

First, the gasket 50 is adhered to the outer circumferential end surface 22 of the spoke 20, and the spoke 20 is inserted into the circular tube of the rim 10 with position adjustment.

Next, the adhesive 40 is coated on an outer circumferential surface of the bushing 33 (or the adhesive 40 is coated on the inner circumferential surface of the fastening through hole 31), and the bushing 33 is inserted into the fastening through hole 31.

The adhesive 40 is coated on an outer circumferential surface of the male screw member 34 (or the adhesive 40 may be coated on the inner circumferential surface of the bushing 33), and the shaft portion 34b of the male screw member 34 is inserted into the cylindrical hole of the bushing 33 and the female screw hole 32. The male screw member 34 is screwed with the female screw hole 32 at a predetermined fastening torque.

At last, excessive adhesive is removed, and a curing process for the adhesive is performed (excessive adhesive at corners of the male screw member 34 are not positively removed to keep a sufficient air-tightness).

Figure 4:
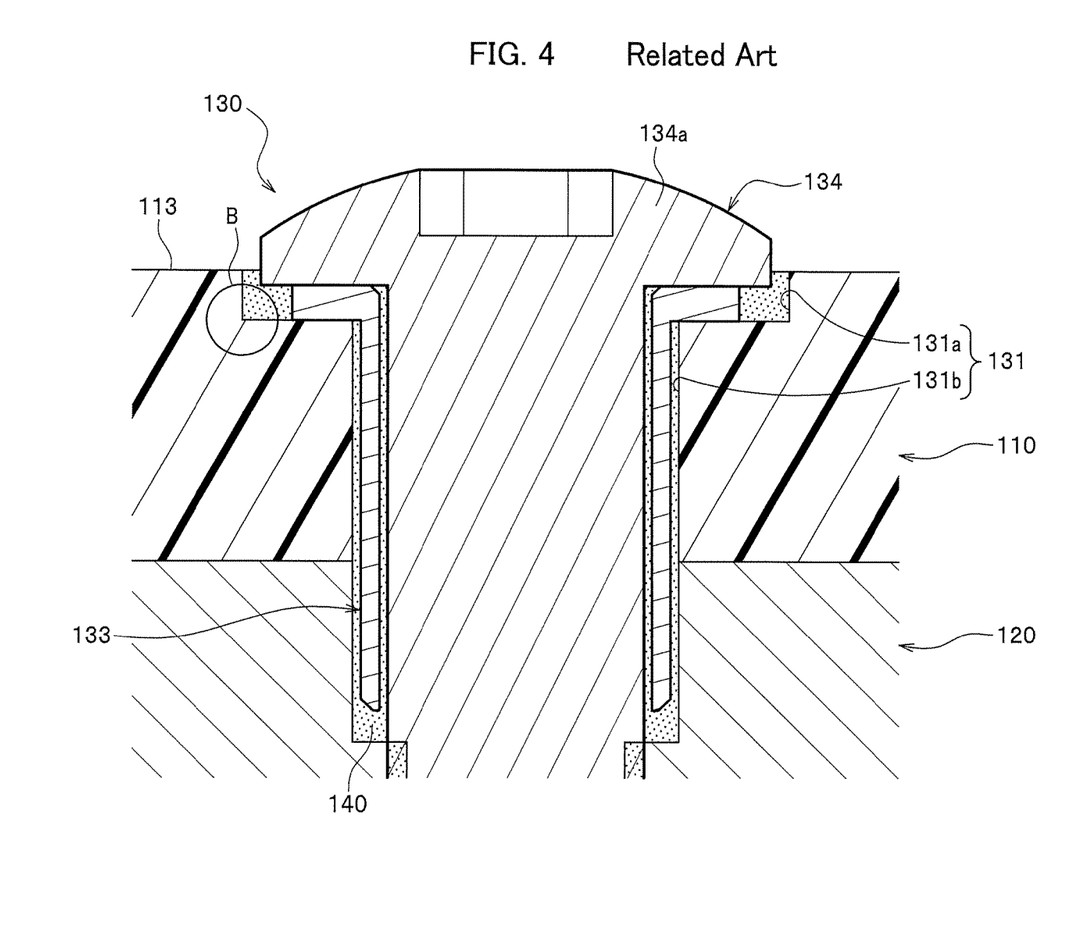
FIG. 4 is an enlarged cross section of a fastening member according related art.

In contrast to this embodiment, in a fastening means 130 of related art shown in FIG. 4, a fastening through hole 131 includes a circular hollow portion 131a and a through hole 131b.

The circular hollow portion 131a is a hollow portion having an annular shape and has a cut surface having a hollow cylindrical shape extending vertical to a tube outer circumferential surface 113 of the rim 110.

The through hole 131b is a through hole penetrating a center portion of the circular hollow portion 131a.

A male screw member 134 is inserted into the circular hollow portion 131a and screwed, so that a head portion 134a of the male screw member 134 is inserted. Accordingly, a rim 110 and a spoke 120 are fastened.

Gaps made around the rim 110, a bushing 133, and the male screw member 134 in the fastening through hole 131 are charged with an adhesive 140.

In this configuration, on the hole wall of the fastening through hole 131, a cutting surface of the carbon fibers is exposed and this configuration is insufficient to press the carbon fibers in a piling direction at circumferential edge of the fastening through hole 131. Accordingly, the related art has a problem that the carbon fibers tend to be separated at the hole wall and processing corners due to aging or changing of input load.

A stress generated when the male screw member 34 is fastened tends to be concentrated at the part at the end portion in a diametrical direction of the head portion 34a. Accordingly the stress generated when the male screw member 34 is screwed may be concentrated at a corner part of the circular hollow portion 131a (Part B in FIG. 4), so that cracks may occur around the corner part. This is a problem.

Further, there may be another problem that a creep phenomenon tends to occur because the stress is concentrated on circumference of the corner portions and the bottom portion of the circular hollow portion 131a. Here, the creep phenomenon is a phenomenon in which distortion increases as time passes in a case where a stress is continuously applied to an object.

In contrast to this, according to the configuration of the embodiment, the conical tube 33a of the bushing 33 is overlapped over the cutting surface of the conical hollow portion 31a with contact therebetween, so that a force of the male screw member 34 pushes the carbon fibers forming the rim 10 in the piling direction. Accordingly, the separation of the carbon fibers can be suppressed.

Further, the conical hollow portion 31a is a hollow portion having a conical shape, which eliminates formation of corner parts and disperses the stress of the male screw member 34 in an axial direction and the diametrical direction, which suppress generation of cracks due to concentration of the stress.

Next, an operation of the vehicle wheel 1 according to the embodiment is described below.

Since the male screw member 34 is disposed so as to penetrate the tube wall 11 of the rim 10 from a side of the tube outer circumferential surface side, the male screw member 34 is disposed inside the pneumatic tire T.

This provides fastening the rim 10 to the spoke 20 without externally exposure of the male screw member 34, which suppress occurrence of electrolytic corrosion between the rim 10 and the spoke 20.

Further, the larger diameter side end portion 33aa of the conical tube 33a in the bushing 33 is made larger than the head portion diameter D34a of the male screw member 34, which can reduce a surface pressure received by the rim 10 while the male screw member 34 is fastened.

This suppresses occurrence of the creep phenomenon in the rim 10.

As the male screw member 34, a countersunk screw, which has a flat end surface of the head portion 34a, is used. This can suppress a protruding quantity of the head portion 34a outward in a diametrical direction of the vehicle wheel 1.

This configuration eliminates obstruction during attachment and detachment of the pneumatic tire T to and from the rim 10. More specifically, the electrolytic corrosion can be suppressed between the rim 10 and the spoke 20 and between the male screw member 34, the bushing 33, and the rim 10 without decrease in attaching and detaching operation ability of a pneumatic tire T to the rim 10.

The outer diameter on a side of a lager diameter side D33ac of the bushing 33 is set to be greater than the head portion diameter D34a of the male screw member 34, which provides such a configuration that the part of the bushing 33 having a largest thickness in the axial direction receives a stress variation of the male screw member 34 even when a bending moment is applied to the wheel.

This disperses the stress caused by the male screw member 34 at a part having a high stiffness in the bushing 33, which moderates an outer circumferential pressure to the rim 10.

Further, the inner surface vertical angle θ33ad of the conical tube 33a in the bushing 33 is set to be substantially 90 degrees, which enables to use a countersunk screw based on a standard which is generally circulated.

This suppresses increase in the manufacturing cost.

The inner surface vertical angle θ33ad of the conical tube 33a of the bushing 33 is set to be substantially 120 degrees, which reduces a protruding quantity and secures a larger seating area, so that the stress caused by the bolt during fastening the bolt is efficiently dispersed.

This further suppresses occurrences of the creep phenomenon at the rim 10.

Further, the male screw member 34 is made of titan material which suppresses increase in weight and occurrence of the electrolytic corrosion. A stainless steel is used for the bushing 33, which suppress the manufacturing cost and occurrence of the electrolytic corrosion. More specifically, the male screw member 34 and the bushing 33 are made of different materials to suppress the occurrence of the electrolytic corrosion while the manufacturing cost and the weight are suppressed.

Accordingly, if the weight reduction is prioritized to suppressing manufacturing cost, both the male screw member 34 and the bushing 33 can be made of the titanium material.

If the suppressing manufacturing cost is prioritized to the weight reduction, both the male screw member 34 and the bushing 33 are made of the stainless material.

To prevent the male screw member 34 of the vehicle wheel 1 from being operated by the person by the purchaser, etc (for example, further fastening, or removing the male screw member 34 which has been fastened), a recess 34c, which is a hollow portion to be coupled to a tool such as a driver, etc. for fastening or losing the male screw member 34, is charged with a filler material, which is efficient.

Further, in addition to the charging the recess 34c, it is efficient that a shear bolt, which is torsionally cut at a torque applying portion when a fastening torque greater than a preset value is applied thereto, and a so-called mischief prevention screw is used for the male screw member 34.

Second Embodiment

Next, a second embodiment of the vehicle wheel 1 is described below, referring to drawings. The same or corresponding elements as those in the vehicle wheel 1 described above are designated with the same or like reference, and a duplicated explanation is omitted.

Figure 5:
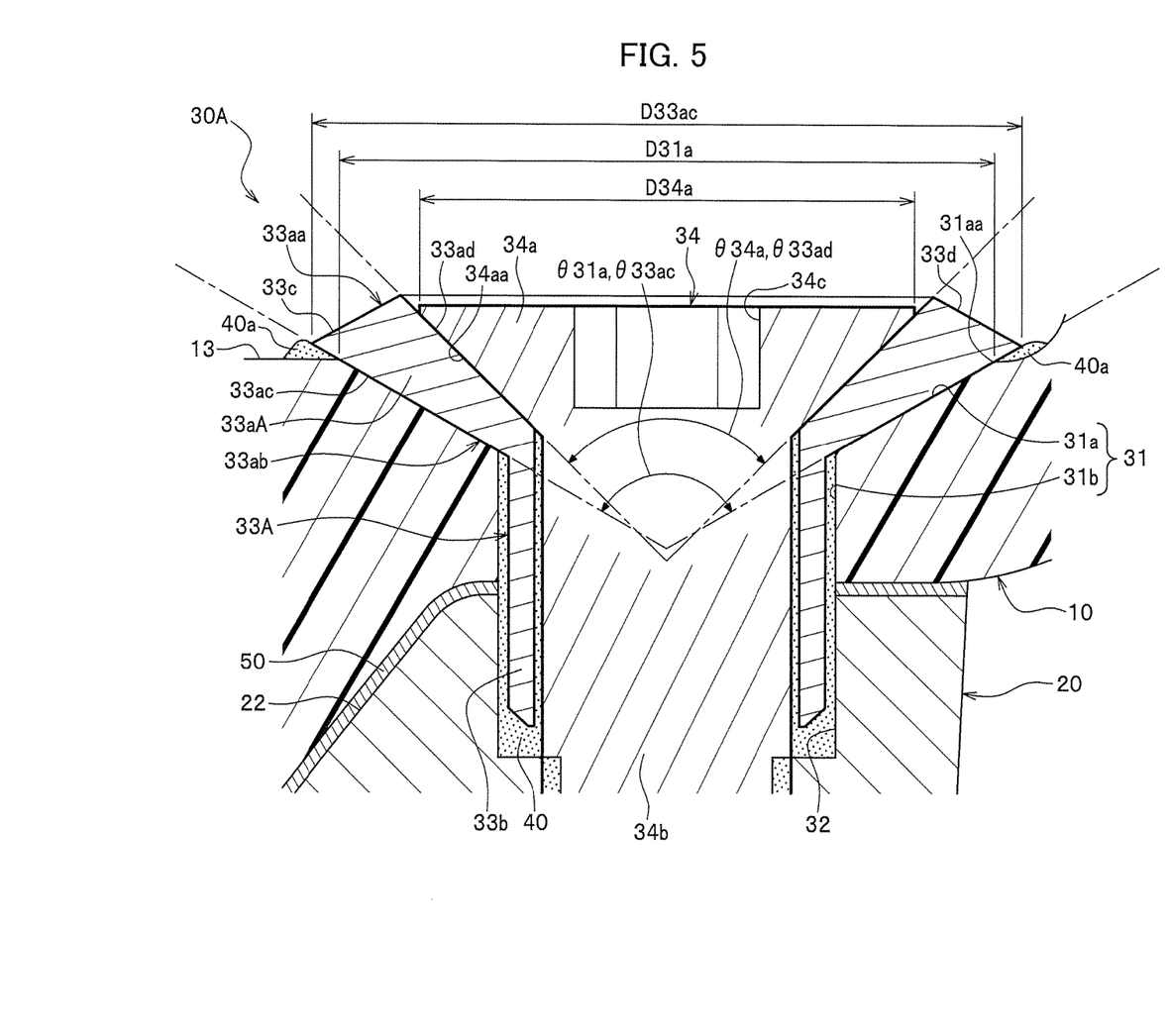
FIG. 5 is an enlarged cross section view of a through hole according to a second embodiment.

A large difference between the first embodiment and the second embodiment is, as shown in FIG. 5, in a shape of a conical tube 33aA of a bushing 33A forming a fastening member 30A.

The inner surface vertical angle θ33ad of the bushing 33A is substantially 90 degrees and the conical shape outer circumferential surface 33ac is 120 degrees, which are unchanged. On the other hand, the outer diameter on a side of a lager diameter side D33ac of the conical tube 33aA is set to be a diameter greater than the opening diameter D31a of the opening 31aa of the conical hollow portion 31a of the fastening through hole 31.

This forms a peaked portion 33c at a circumferential edge portion on the larger diameter side of the conical tube 33aA. Accordingly, a gap is made between the peaked portion 33c and the tube outer circumferential surface 13 of the rim 10. Next, an adhesive agent reservoir 40a is formed by charging the adhesive 40 into the gap.

Next, an operation of the vehicle wheel 1 according to the second embodiment is described below.

In the vehicle wheel 1 including the fastening member 30A according to the second embodiment, the gap between the rim 10 in the fastening through hole 31 and the bushing 33 can be more surely charged by forming the adhesive agent reservoir 40a in addition to the operation according to the first embodiment.

Accordingly, the air-tightness in the tire air chamber TR can be further increased.

Third Embodiment

Next, a third embodiment of the vehicle wheel 1 is described, referring to drawings. The same or corresponding elements as the elements in the vehicle wheel 1 are designated, and a duplicated description is omitted.

Figure 6:
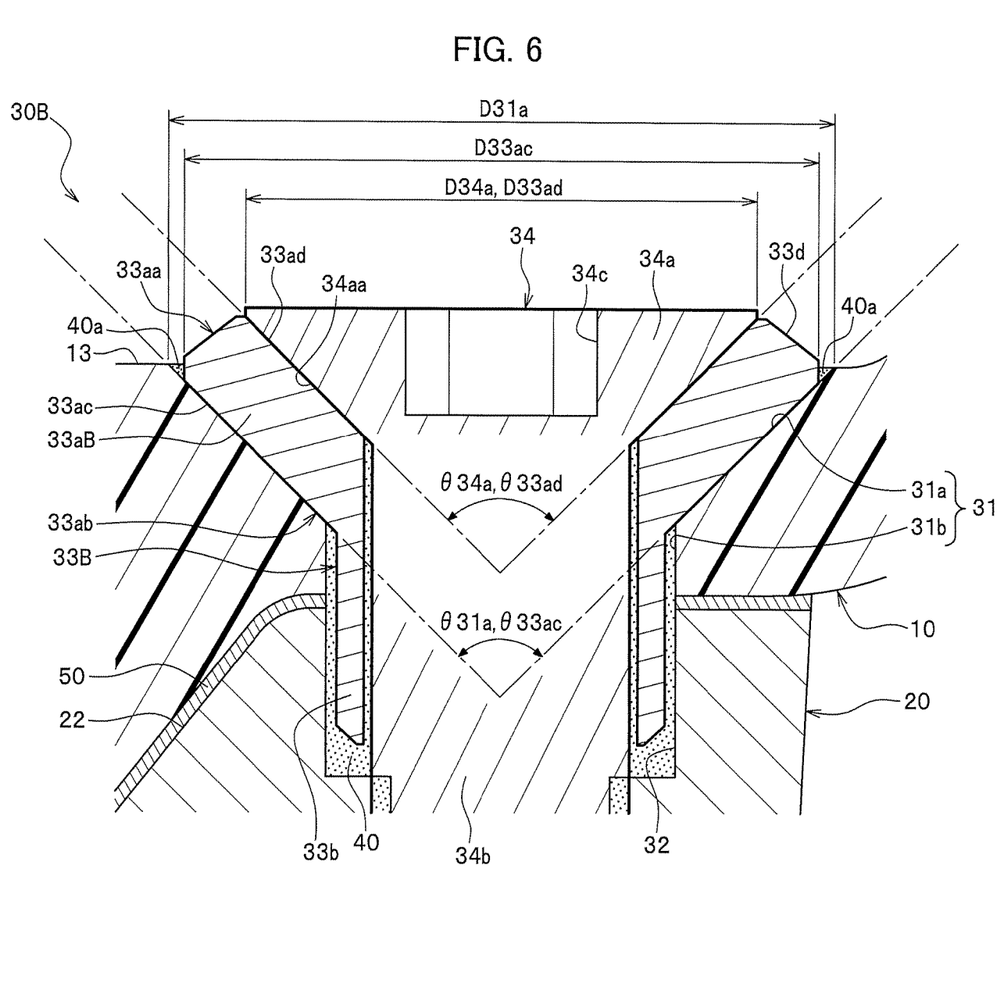
FIG. 6 is an enlarged cross section view of a through hole according to a third embodiment.

As shown in FIG. 6, a large difference from the first embodiment is in the shape of a conical tube 33aB of a bushing 33B forming a fastening member 30B.

In the conical tube 33aB of the bushing 33B, the vertical angle (outer circumferential surface vertical angle θ33ac) of the conical shape in the conical shape outer circumferential surface 33ac, which is an outer circumferential surface of the conical tube 33aB is set to a substantially 90 degrees, and a vertical angle of the conical shape in the cone inner circumferential surface 33ad which is an inner circumferential surface is set to a substantially 90 degrees.

Next, an operation and an advantageous effect according to the embodiment are described below.

In the vehicle wheel 1 including the fastening member 30B according to the embodiment, a mechanical strength at a connecting part between the conical tube 33aB and the straight tube portion 33b increases relative to the bushing 33 according to the first embodiment.

This makes it easy to deal the bushing 33B, which increases assembling operation ability.

Fourth Embodiment

Next, a fourth embodiment of the vehicle wheel 1 is described below referring to drawings. The same or corresponding elements are designated with those of the vehicle wheel 1 according to the first embodiment, and a duplicated description is omitted below.

Figure 7:
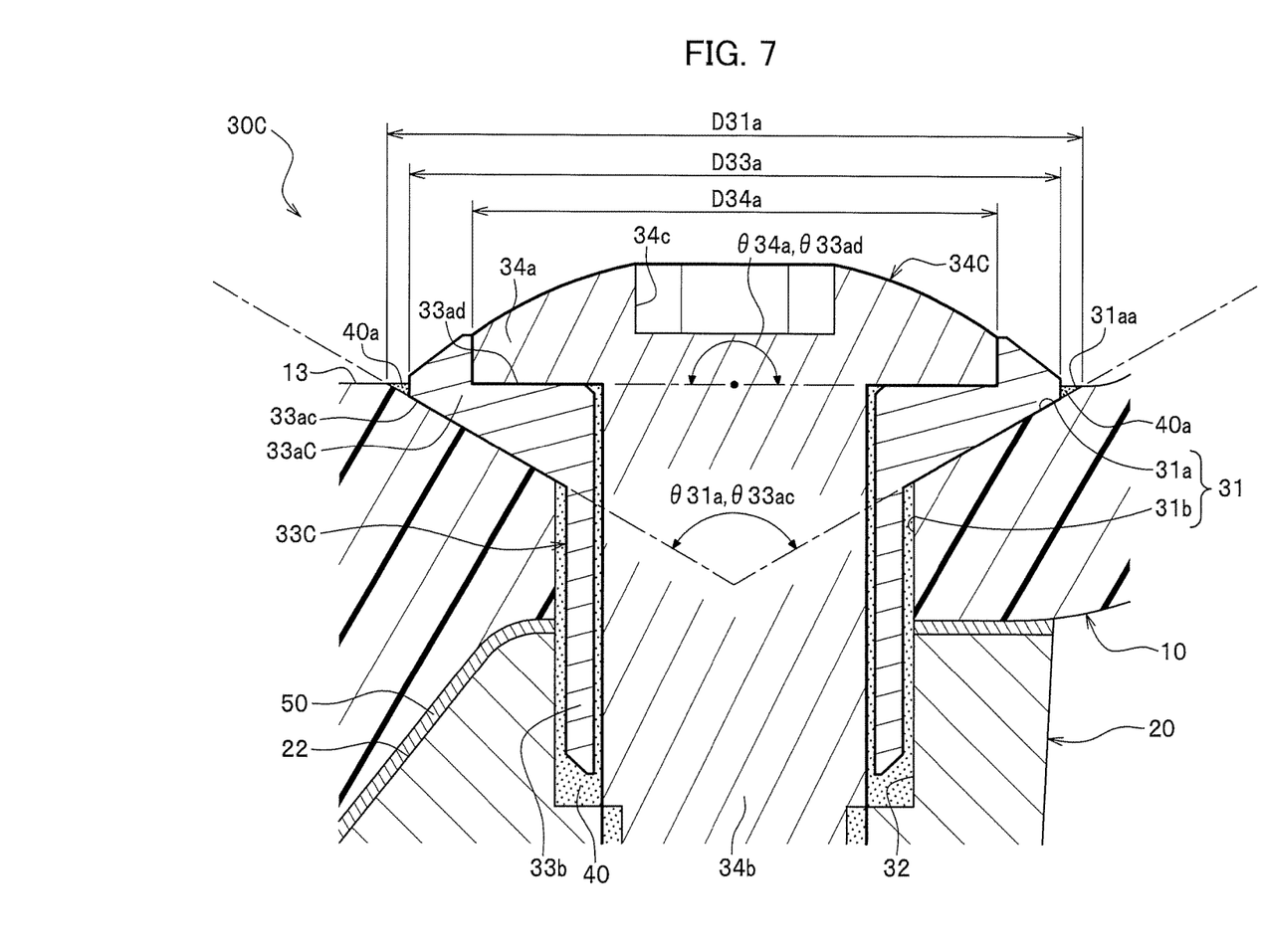
FIG. 7 is an enlarged cross section view of a through hole according to a fourth embodiment.

As shown in FIG. 7, a large difference between the fourth embodiment and the first embodiment is in the shapes of a male screw member 34C and a bushing 33C forming a fastening means 30C.

The male screw member 34C comprises a pan head screw which includes the head portion 34a which is round, i.e., partially spherical shape, and has a head portion vertical angle θ34a which is set to substantially 180 degrees.

In the bushing 33C, the inner surface vertical angle θ33ad of a conical tube 33aC is set to 180 degree to match the shape of the head portion 34a.

Further, in the conical tube 33aC of the bushing 33C, a vertical angle of the conical shape of the conical outer circumferential surface 33ac which is an outer circumferential surface of the conical tube 33aC (the outer circumferential surface vertical angle θ33ac) is set to substantially 120 degrees similarly to the first embodiment.

Further, an outer diameter of the conical tube 33aC is set to be slightly smaller than a diameter of the opening 31aa of the conical hollow portion 31a of the fastening through hole 31.

Next, an operation and an advantageous effect according to the fourth embodiment are described below.

In the vehicle wheel 1 including the fastening means 30C according to the fourth embodiment, it is possible to use a pan screw which is widely used and a standard member in addition to the operation and advantageous effect according to the first embodiment.

This suppresses increase in cost of the manufacturing cost.

Fifth Embodiment

Next, the vehicle wheel 1 accordance with a fifth embodiment is described below referring to drawings. The same or corresponding elements are designated with the same elements, similar to the vehicle wheel 1, and duplicated description is omitted.

Figure 8:
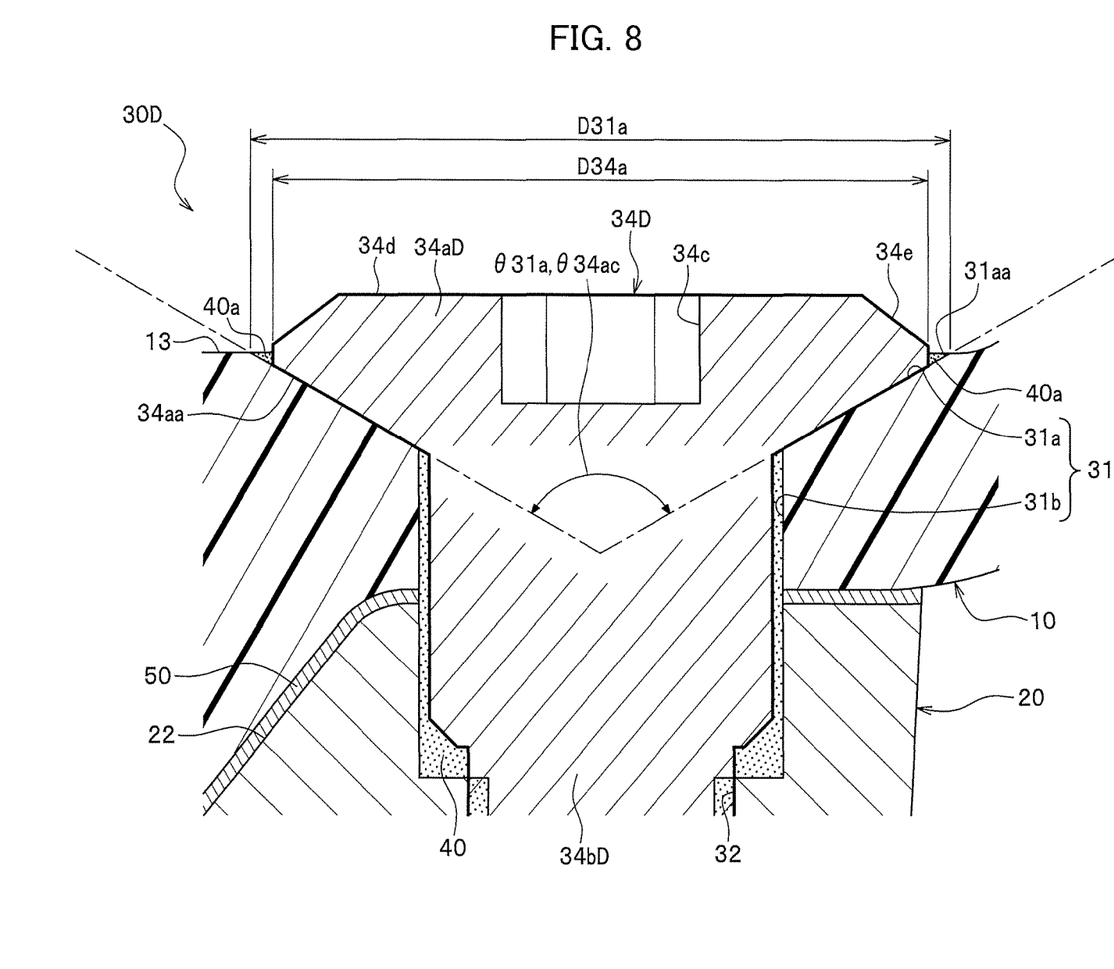
FIG. 8 is an enlarged cross section view of a through hole according to a fifth embodiment.

As shown in FIG. 8, a large difference from the first embodiment is in a fastening member 30D.

In the first embodiment, the bushing 33 intervenes between the fastening through hole 31 and the male screw member 34. On the other hand, in the fifth embodiment, a male screw member 34D is fastened to the fastening through hole 31 without intervening of the bushing 33. In place of intervening of the bush, the male screw member 34D has the feature of the bushing 33.

More specifically, a head portion 34aD of the male screw member 34D is formed to have the configuration corresponding to the conical tube 33a in the bushing 33 of the first embodiment. Further, a shaft portion 34bD of the male screw member 34D is formed integrally with the configuration corresponding to the straight tube portion 33b in the bushing 33. The male screw member 34D has a configuration of a so-called stepped screw with the head portion 34aD and the shaft portion 34bD.

The head portion 34aD of the male screw member 34D is so-called countersunk screw having a conical shape. However, an end surface 34d in which the recess 34c is formed is formed in a substantially circular truncated cone shape of which a circumferential edge 34e is inclined in a taper.

Further, in the head portion 34aD, the head portion vertical angle θ34a, which is a vertical angle of the conical shape, is set to substantially 120 degrees.

The vertical angle θ31a at the hollow portion, which is a vertical angle of the conical shape in the conical hollow portion 31a forming the fastening through hole 31, is set to substantially 120 degrees, which is similar to the first embodiment.

Further the opening diameter D31a of the conical hollow portion 31a is set to be larger than the head portion diameter D34a of the male screw member 34, which is also similar to the first embodiment.

Next, an operation and an advantageous effect of the vehicle wheel 1 according to the fifth embodiment are described.

In the vehicle wheel 1 including the fastening member 30B according to the fifth embodiment, the operation and advantageous effect according to the first embodiment can be provided.

Further, the head portion vertical angle θ34a, which is a vertical angle of the conical shape in the head portion 34aD and the hollow portion vertical angle θ31a which is vertical angle of the conical shape in the conical hollow portion 31a forming the fastening through hole 31 are set to substantially 120 degrees. This reduces a protruding quantity and has the larger seating area, which can efficiently disperse the stress by the bolt upon bolt fastening.

This can suppress occurrence of creep phenomenon in the rim 10.

Further, this eliminates necessity of the bushing, which reduces the number of the components.

In addition, because of no need of the bushing, a process in which the bushing is inserted into the fastening through hole 31 after coating the adhesive 40 on the bushing during assembling can be omitted, which can simplify the assembling operation.

Further, no need of the bushing eliminates the gaps between the bushing and the fastening through hole 31, which can increase the air-tightness.

In the fifth embodiment, an end surface of the head portion 34aD is formed into the circular truncated cone. However, this invention is not limited to this. For example, it is possible to form the end surface of the head portion 34a into a partially spherical shape such as a circular countersunk screw.

Further in the fifth embodiment, similar to the first embodiment, the opening diameter D31a is set to be larger than the head portion diameter D34a of the male screw member 34. However, as shown by the bushing 33A according to the second embodiment in FIG. 5, the opening diameter D31a of the conical hollow portion 31a is set to be smaller than the head portion diameter D34a of the male screw member 34.

In such a configuration, similarly to the second embodiment, the gap between the rim 10 and the male screw member 34 in the fastening through hole 31 can be surely buried by forming the adhesive 40, so that the air-tightness in the tire air chamber TR can be increased further.

According to the above-described configuration, the male screw member 34 is disposed, penetrating the tube wall from an outer circumferential surface of the tube of the rim, so that the male screw member 34 is disposed inside the tire air chamber. Accordingly, the male screw member 34 can fasten the rim and the spoke without external exposure of the male screw member 34, which suppress occurrence of electrolytic corrosion between the rim and the spoke.

Further, the larger diameter side end portion of the conical tube portion of the bushing is set to have a diameter larger than a diameter of the head portion of the male screw member. This can suppress occurrences of the creep phenomenon in which, when a stress is generated continuously in a body, a distortion increases as time passes.

The invention claimed is:
1. A vehicle wheel comprising:
a rim that is made of fiber-reinforced resin and has a substantially circular tube shape;
a fastening through hole penetrating a wall of a tube of the rim;
a bushing that has a substantially tube shape and is inserted through the fastening through hole;
a spoke that is disposed inside the rim and made of a light metal;
a female screw hole that opens at a circumferential surface of the spoke and has female thread on an inner circumferential surface thereof; and
a male screw member that penetrates the bushing from a side of outer circumferential surface of the tube of the rim and engages with the female screw hole to fasten the rim to the spoke,
wherein the fastening through hole comprises:
a conical hollow portion hollowed in a conical shape in the outer circumferential surface of the tube of the rim; and
a through hole penetrating the rim in a diametrical direction at a center portion of the conical hollow portion, wherein an opening on a side of the outer circumferential surface of the tube at the conical hollow portion is set to have a larger diameter than a diameter of a head portion of the male screw member;

wherein the bushing comprises:

a conical tube portion having a conical exterior shape which is substantially equivalent to the conical shape of the conical hollow portion, and wherein an end portion on a large diameter side of the conical tube is set to have a diameter larger than a diameter of the head portion of the male screw member.

2. The vehicle wheel as claimed in claim 1, wherein the male screw member comprises a countersunk screw.

3. The vehicle wheel as claimed in claim 1, wherein the conical tube portion of the bushing has an external vertical angle, which is a vertical angle of a conical shape on a conical outer circumferential surface of the conical tube portion and an interior vertical angle, which is a vertical angle of a conical shape on a conical inner circumferential surface, which is an inner surface of the conical tube portion, the external vertical angle being greater than the interior vertical angle.

4. The vehicle wheel as claimed in claim 1, wherein the conical tube portion has an interior vertical angle, which is a vertical angle of a conical shape on a conical inner circumferential surface of the conical tube portion is set to substantially 90 degrees.

5. The vehicle wheel as claimed in claim 1, wherein the conical tube portion of the bushing has an exterior vertical angle, which is a vertical angle of a conical shape on a conical outer circumferential surface of the conical tube portion is substantially 120 degrees.

6. The vehicle wheel as claimed in claim 1, wherein the bushing has an outer diameter on a larger diameter side of the conical tube portion, which is an outer circumferential diameter of the end portion on the larger diameter side of the conical tube portion, is set to be greater than a diameter of the opening portion of the conical hollow portion.

7. A vehicle wheel comprising:

a rim which is made of fiber-reinforced resin and has a substantially circular tube shape;

a fastening through hole penetrating a wall of a tube of the rim;

a spoke which is disposed inside the tube of the rim and made of a light metal;

a female screw hole that opens at a circumferential surface of the spoke and has female thread on an inner circumferential surface thereof;

a male screw member penetrating the fastening through hole and engaging with the female screw hole to fasten the rim to the spoke;

wherein the male screw member comprises a head portion having a substantially conical shape;

a head portion vertical angle, which is a vertical angle of the conical shape, is set to substantially 120 degrees;

wherein the fastening through hole comprises a conical hollow portion hollowed in a substantially conical shape on an outer circumferential surface of the rim; and a through hole penetrating the rim in a diametrical direction at a center portion of the conical hollow portion;

wherein the conical hollow portion has a hollow portion vertical angle which is a vertical angle of the conical shape is set equivalently to a head portion vertical angle.

* * * * *